(12) United States Patent
Rao et al.

(10) Patent No.: US 9,858,163 B2
(45) Date of Patent: *Jan. 2, 2018

(54) DUAL ADJACENCY BETWEEN EDGE DEVICES AT A NETWORK SITE

(71) Applicant: Cisco Technology, Inc., San Jose, CA (US)

(72) Inventors: Dhananjaya Rao, Milpitas, CA (US); Victor M. Moreno, Carlsbad, CA (US); Hasmit Grover, Fremont, CA (US); Gaurav Badoni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/721,135

(22) Filed: May 26, 2015

(65) Prior Publication Data

US 2015/0254149 A1 Sep. 10, 2015

Related U.S. Application Data

(63) Continuation of application No. 13/361,014, filed on Jan. 30, 2012, now Pat. No. 9,071,458.

(51) Int. Cl.
*G06F 15/16* (2006.01)
*G06F 11/20* (2006.01)
*H04L 12/911* (2013.01)
*H04L 12/46* (2006.01)
*H04L 12/751* (2013.01)
*H04L 29/08* (2006.01)

(52) U.S. Cl.
CPC ...... *G06F 11/2033* (2013.01); *H04L 12/4641* (2013.01); *H04L 45/02* (2013.01); *H04L 47/746* (2013.01); *H04L 67/141* (2013.01); *G06F 2201/86* (2013.01)

(58) Field of Classification Search
None
See application file for complete search history.

(56) References Cited

U.S. PATENT DOCUMENTS 6,856,991 B1 2/2005 Srivastava
7,159,034 B1 1/2007 Rai
7,827,262 B2 11/2010 Weis
(Continued)

*Primary Examiner* — Joseph E Avellino
*Assistant Examiner* — Phyllis A Book
(74) *Attorney, Agent, or Firm* — Edell, Shapiro & Finnan, LLC

(57) ABSTRACT

Devices, methods and instructions encoded on computer readable medium for implementation of a dual-adjacency between edge devices of a network site. A first edge device comprises one or more local interfaces configured for communication, via a local network, with one or more network devices co-located in a first network site. The first edge device also comprises one or more overlay interfaces configured for communication, via a core network, with one or more network devices located in one or more other network sites connected to the core network. The first edge device comprises a processor configured to establish, via at least one of the local interfaces, a site communication channel with a second edge device co-located in the first network site. The processor is further configured to establish an overlay communication channel, via at least one of the overlay interfaces, with the second edge device.

20 Claims, 7 Drawing Sheets

(56) References Cited

U.S. PATENT DOCUMENTS

| | | | |
|---|---|---|---|
| 7,983,153 B2* | 7/2011 | Filsfils | H04L 45/02 370/219 |
| 8,780,699 B1* | 7/2014 | Hasan | H04L 1/22 370/219 |
| 8,792,501 B1 | 7/2014 | Rustagi et al. | |
| 2006/0209831 A1 | 9/2006 | Shepherd et al. | |
| 2006/0262735 A1 | 11/2006 | Guichard et al. | |
| 2008/0316914 A1 | 12/2008 | Vercellone et al. | |
| 2009/0037607 A1* | 2/2009 | Farinacci | H04L 12/4641 709/249 |
| 2010/0131620 A1 | 5/2010 | Kondamuru et al. | |
| 2010/0329109 A1* | 12/2010 | Kothari | H04L 45/16 370/216 |
| 2011/0110370 A1 | 5/2011 | Moreno et al. | |
| 2011/0211444 A1 | 9/2011 | Das et al. | |
| 2012/0063465 A1 | 3/2012 | Keesara et al. | |
| 2012/0219004 A1 | 8/2012 | Balus et al. | |

\* cited by examiner

DUAL ADJACENCY BETWEEN EDGE DEVICES AT A NETWORK SITE

CROSS REFERENCE TO RELATED APPLICATIONS

This application is a continuation of U.S. patent application Ser. No. 13/361,014, filed Jan. 30, 2012, the entirety of which is incorporated herein by reference.

TECHNICAL FIELD

The present disclosure relates to communications between edge devices in a network site.

BACKGROUND

Modern data center deployments typically span multiple sites, each with its own local network. The multiple sites are generally interconnected via a larger network so that the sites can share information and resources. This larger interconnecting network is referred to herein as a core network.

Each site includes one or more network devices, referred to herein as edge devices (nodes), that facilitate the transport of information between the local network implemented in the site and the core network (i.e., originate or terminate communications over the network). The sites also include one or more intermediate network devices (nodes) that facilitate the operation of the local network for the communications between computing devices in the site and the edge devices.

DESCRIPTION OF EXAMPLE EMBODIMENTS

Overview

Devices, methods and instructions encoded on computer readable medium are provided herein for implementation of a dual-adjacency between edge devices of a network site. More specifically, a first edge device comprises one or more local interfaces configured for communication, via a local network, with one or more network devices co-located in a first network site. The first edge device also comprises one or more overlay interfaces configured for communication, via a core network, with one or more network devices located in one or more other network sites connected to the core network. The first edge device comprises a processor configured to establish, via at least one of the local interfaces, a site communication channel with a second edge device co-located in the first network site. The processor is further configured to establish an overlay communication channel, via at least one of the overlay interfaces, with the second edge device. As such, the overlay communication channel is topologically divergent from the site communication channel.

Example Embodiments

Figure 1:
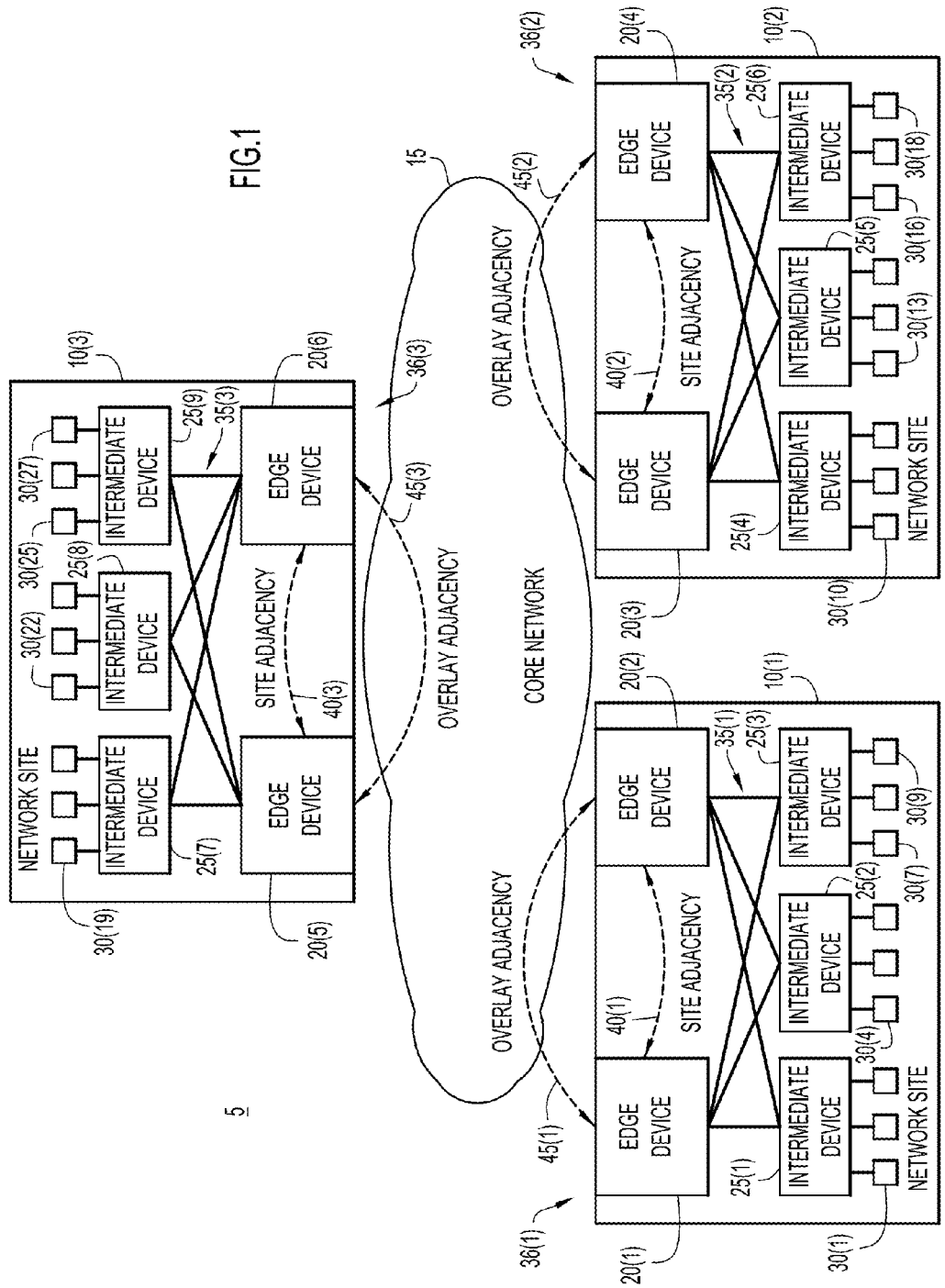
FIG. 1 is a block diagram showing an example of multiple network sites communicating via a core network.

FIG. 1 is a block diagram of an entity 5 (e.g., data center, corporation, university, etc.) having multiple sites 10(1)-10(3). For ease of illustration, examples will be described with reference to entity 5 operating as a data center in which the multiple sites 10(1)-10(3), sometimes referred to herein as network sites, are interconnected by a core network 15. As described below, the core network 15 may use one or more layer 2 (L2) and/or layer 3 (L3) domains interconnecting the network sites 10(1)-10(3) with one or more virtual local area networks (VLANs).

Network site 10(1) comprises two edge network devices 20(1) and 20(2), three intermediate network devices 25(1)-25(3), and a plurality of computing devices 30(1)-30(9). Similarly, network site 10(2) comprises two edge network devices 20(3) and 20(4), three intermediate network devices 25(4)-25(6), and a plurality of computing devices 30(10)-30(18). Network site 10(3) comprises two edge network devices 20(5) and 20(6), three intermediate network devices 25(7)-25(9), and a plurality of computing devices 30(19)-30(27).

The edge network devices 20(1)-20(6), simply referred to herein as edge devices, are configured to facilitate the transport of information between the local networks 35(1)-35(3) on their respective site and the core network 15. The intermediate network devices 25(1)-25(9) are configured to facilitate the operation of the local network 35(1)-35(3) for each network site 10(1)-10(3). The local networks 35(1)-35(3) enable communications between the computing devices 30(1)-30(27) in the various network sites 10(1)-10(3) and the edge devices 20(1)-20(6).

The network sites 10(1), 10(2), and 10(3) each include an edge device pair, namely edge device pair 36(1) (comprising edge devices 20(1) and 20(2)), edge device pair 36(2) (comprising edge devices 20(3) and 20(4)), and edge device pair 36(3) (comprising edge devices 20(5) and 20(6)), respectively. The edge devices in each pair are configured to communicate with one another via two topologically divergent/different communication channels (links). Each communication channel is referred to herein as an adjacency between the edge devices and, as such, a dual-adjacency is created between the edge devices in each edge device pair 36(1)-36(3). For example, the edge devices 20(1) and 20(2) in pair 36(1) have a first adjacency that is created through the local network 35(1), and a second adjacency that is created through the core network 15. The first adjacency is sometimes referred to herein as a site adjacency 40(1) or site communication channel, and is enabled by intermediate devices 25(1)-25(3). The second adjacency is sometimes referred to as an overlay adjacency 45(1) or overlay communication channel, and is enabled, for example, over a VLAN in a layer 2 or layer 3 domain spanning the core network 15.

It is appreciated that edge devices 20(3) and 20(4) and edge devices 20(5) and 20(6), included in pairs 36(2) and 36(3), respectively, are also configured for dual-adjacency. For ease of illustration, examples will be described with reference to edge device pair 36(1).

The use of the site adjacency 40(1) with the overlay adjacency 45(1) provides a redundant mechanism through which a failure affecting either the core network 15 or the local network 35(1), detected by a first edge device in pair 36(1) may be communicated to the other edge device so that corrective action, as necessary, may be initiated. For example, the dual-adjacency allows the edge devices 20(1) and 20(2) to continue to communicate on the overlay adjacency 45(1) even if configuration errors and connectivity issues with the network site 10(1) disable the site adjacency 40(1). In certain examples described below, the edge devices 20(1) and 20(2) are configured with a site-identifier that enables the edge devices to determine, over the core network 15, that they belong to the same site and that the overlay adjacency 45(1) should be created. Additionally, the edge devices 20(1) and 20(2) can determine that they belong to the same site via static configuration or by leveraging information from the Layer-2 protocols configured in the site. The agreed upon site identifier is used for the purposes of multi-homing the site containing edge devices 20(1) and 20(2).

In practice, edge devices 20(1)-20(6) may be, for example, a switch or router. Intermediate network devices 25(1)-25(9) may be, for example, switches, routers, etc. Computing devices 30(1)-30(27) may be, for example, computers (e.g., laptops or desktops.), mobile devices, servers, etc.

FIG. 1 illustrates a specific example having three sites 10(1)-10(3) that each include two edge devices. It should be appreciated that, in alternative examples, more or less sites, as well as additional edge devices may be provided. The use of two edge devices is merely to facilitate illustration of the dual-adjacency concepts described herein. In general, when network sites 10(1)-10(3) are connected to a VPN, there is a desire to do so in a resilient manner and, as such, multiple edge devices will be used.

The core network 15 comprises a layer 2 or layer 3 infrastructure supporting layer 2 or layer 3 virtual private networks (VPNs). In one example, the core network 15 supports an overlay network that is implemented through an Overlay Transport Virtualization (OTV) mechanism that provides an "overlay" method of virtualization (rather than traditional "in-the-network" methods in which multiple routing and forwarding tables are maintained in every device between a source and a destination). With OTV, state is maintained at the network edges (i.e., edge devices communicating over the core network 15), but is not maintained at other devices within a network site or in the core network 15. In other words, OTV operates at the edge devices 20(1)-20(6) interposed between the network sites 10(1)-10(3) and the core network 15. The edge devices 20(1)-20(6) perform layer 2 learning and forwarding functions (similar to a traditional layer 2 switch) on their site-facing interfaces (site interfaces) and perform Internet Protocol (IP) based virtualization functions on their core-facing interfaces (core interfaces), for which an overlay network is created. The dual functionality of the edge device 20(1)-20(6) provides the ability to connect layer 2 networks, layer 3 networks, or hybrid (layer 2 and layer 3) networks together. OTV can also run at the same time as the network sites 10(1)-10(3) and the core network 15 are operating "in-the-network" virtualization via VRF (Virtual Routing and Forwarding) or VNET (Virtual Network). For ease of illustration, a separate overlay network is not shown in FIG. 1, but rather is represented by core network 15.

In operation, OTV encapsulates layer 2 traffic with an IP header and does not include the creation of stateful tunnels. Furthermore, layer 2 traffic that traverses the overlay network to reach its destination is prepended with an IP header. This ensures that the packet is delivered to the edge devices that provide connectivity to the layer 2 destination in the original Media Access Control (MAC) destination header. Traffic is forwarded natively in the core network 15 over which OTV is deployed, based on the IP header. The native IP treatment of the encapsulated packet allows optimal multi-point connectivity as well as optimal broadcast and multicast forwarding. OTV is independent of the technology deployed in the core network 15 and there are no changes to core devices.

OTV provides a state to map a given destination MAC address in a layer 2 VPN to the IP address of the OTV edge device behind which that MAC address is located. OTV forwarding is therefore a function of mapping a destination MAC address in the VPN site to an edge device IP address in the overlay network. A control plane is used to exchange reachability information among the different OTV edge devices. In one example the control plane uses an overlay IGP (Interior Gateway Protocol) to carry MAC addresses and IP addresses. The MAC addresses are those of hosts connected to the network and the IP next hops are the addresses of the edge devices through which the hosts are reachable through the core.

In another example, the control plane utilizes IS-IS (Intermediate System-to-Intermediate System) as an IGP capable of carrying a mix of MAC unicast and multicast addresses as well as IP addresses. The information carried in IS-IS LSPs (Link State Packets) is MAC unicast and multicast addresses with their associated VLAN IDs (or VNIDs in the case of L3 VPNs) and IP next hops. Since all MAC addresses on a site are advertised in IS-IS to all other sites, all edge devices have knowledge of all MAC addresses for each VLAN in the VPN. It is to be understood that routing protocols other than IS-IS may also be used.

Some of the elements in a network that employs OTV may include routers, switches, gateways, servers, or other network devices. OTV defines an overlay network coupled to each edge device 20(1)-20(6) at the sites 10(1)-10(3). The sites are thus connected together via the edge devices 20(1)-20(6) that operate in the overlay network to provide layer 2 and layer 3 connectivity between the sites. In certain examples, there is a single IS-IS process for the overlay network. However, there may also be multiple IS-IS processes running within an overlay network or on a single edge device, with each serving a different VPN. IS-IS may also be configured so that it is fault tolerant across VDCs (Virtual Device Contexts).

Since OTV can work over a layer 2 core transport or a layer 3 core transport, a transport independent mechanism is provided to allow peering between edge devices 20(1)-20(6). The edge devices 20(1)-20(6) include an IP address on their core facing interface, referred to herein as their overlay interfaces, and preferably join a configured ASM (Any Source Multicast)/Bidirectional multicast group in the core transport network 15 by sending IGMP reports. The edge devices 20(1)-20(6) are therefore hosts relative to the core, subscribing to multicast groups that are created in the provider network 15 and which rely on a provider Unicast/Multicast Routing Protocol (pUMRP).

In order for the OTV edge devices 20(1)-20(6) to provide transparency to any bridged domains connected thereto and eliminate unnecessary flooding, the edge devices combine data plane learning on their bridged internal interfaces with control plane learning on their overlay interfaces. The triggering of control plane advertisements and learning by data plane events, along with the interaction of the overlay control plane with the provider control plane and the customer control plane is described below.

OTV leverages three control planes which support each other while operating independently. A provider control plane enables unicast reachability among the edge devices 20(1)-20(6) and also provides the multicast group that makes the edge devices adjacent from the overlay control plane perspective. An overlay control plane is used to exchange reachability information among different OTV edge devices 20(1)-20(6). A client control plane may run across the overlay control plane to get the reachability necessary between client routers to establish routing adjacency in the case of layer 3 VPNs.

As noted above, the control planes operate independently, however, in order to optimize multicasting, multicast control plane events (e.g., reports, joins, leaves) that occur in one MRP may initiate events in another MRP so that the optimal tree is always being used to forward traffic. Also, events in the overlay control plane may be triggered by forwarding events in the client data plane.

The provider control plane includes the set of routing protocols which run in the core infrastructure to be able to deliver packets routed from the site networks 10(1)-10(3). The edge devices 20(1)-20(6) are allocated an IP address out of the core block of addresses. The multicast group that the edge devices join is referred to herein as the Provider Multicast Group (pMG). The pMG is used for edge devices to become adjacent with each other to exchange, for example, IS-IS LSPs, CSNPs, and Hellos. Thus, by virtue of the pMG, all edge devices 20(1)-20(6) see each other as if they were directly connected to the same multi-access multicast-capable segment for the purposes of IS-IS peering. In one example, each VPN uses a unique IS-IS authentication key and a dedicated ASM/Bidir multicast group (pMG) allocated by the core network. The pMG also defines a VPN, therefore, when an edge device joins a pMG, the site becomes part of a VPN. Multiple pMGs define multiple VPNs. The pMG may also be used to broadcast data traffic to all edge devices in the VPN when necessary.

In an alternative example, a full mesh of tunnels can be substituted for the pMG as a way of connecting the edge devices for a given VPN in the overlay network. The configuration of these tunnels may be performed manually or through the use of a discovery mechanism. Head-end replication at the edge devices would be provided for control-plane packets and data-plane packets that should reach all edge devices in the VPN.

The overlay control plane is referred to herein as overlay Unicast/Multicast Routing Protocol (oUMRP). In order to avoid flooding of unknown unicast packets among edge devices, OTV does not perform data-plane learning on the overlay network. Data-plane learning takes place on the internal interfaces to provide compatibility and transparency within the layer 2 sites connecting the OTV overlay network. Regardless of whether OTV is supporting layer 2 or layer VPNs, the edge devices 20(1)-20(6) appear to each VPN site to be providing layer 2-switched network connectivity amongst those sites.

The layer 2-switched overlay network transparently transports the control and data plane traffic for the routed network. The routed or switched customer network is referred to herein as the client network, and cIGP (client IGP) and cUMRP (client Unicast/Multicast Routing Protocol) are used to identify the client control plane components.

MAC learning across the overlay network is based on advertisement of unicast and multicast MAC addresses, which is done by the overlay control plane. The (site-facing) MAC addresses that are locally connected to an edge device 20(1)-20(6) are advertised in the overlay IGP to other edge devices in the VPN. The overlay IGP establishes adjacencies only between edge devices that are in the same VPN. Edge devices 20(1)-20(6) become part of a VPN when they join a multicast group defined in the core (provider-MRP). The Hellos and updates between overlay-IGP peers travel over the multicast group defined in the pMRP. Thus, edge devices 20(1)-20(6) peer with each other as if they were directly connected at layer 2. This peering is possible as all the traffic for the oUMRP is encapsulated with the pMRP group address and sent into the core. Thus, all edge devices in a given VPN receive the oUMRP multicast traffic as if they were all on the same segment.

The oUMRP control traffic is encapsulated with the pMRP group address corresponding to the VPN. The oUMRP is used to inform all edge devices that the subscribers to a particular group are reachable over the overlay network. In one embodiment, the edge devices 20(1)-20(6) snoop IGMP/MLD reports and then the oUMRP notifies all edge devices in the VPN which group has been joined by sending a GM-LSP (Group Membership-Link State Packet) with the group MAC address in it. The IP multicast group address is also sent. The GM-LSP is used to store and advertise multicast MAC (mMAC) addresses learned at a network site 10(1)-10(3). Edge devices 20(1)-20(6) on the receiving sites can join the corresponding group in the provider plane (pMRP) when they snoop the IGMP/MLD traffic from the site. Thus, multicast trees are built natively in the core network 15, and not in the overlay network.

In certain examples, the overlay adjacency 45(1) may be implemented on the overlay network (i.e., using OTV). In accordance with certain examples, the edge devices 20(1) and 20(2) are configured with a new identifier, referred to herein as a site-identifier, such that all edge devices co-located within a network site are configured with the same site-identifier. The site-identifier is included in packets (e.g., IS-IS hello packets sent over both the core network 15 as well as on the local network 35(1)) transmitted between the edge devices 20(1) and 20(2). The site-identifier allows an edge device (e.g., edge device 20(1)) to identify a neighbor edge device (e.g., edge device 20(2)) discovered on the core network (overlay) as being in the same site. Each edge device 20(1) and 20(2) will use a single IS-IS system-identifier to identify itself on both the overlay and local network. Thus, the combination of the site-identifier and the system-identifier will be used to identify a neighbor edge device that's in the same site and which is operational. Dual-adjacencies are only created between edge devices that are co-located in the same site.

Generally, the site-identifier is a user defined statically configured value associated to every OTV edge device. However, in certain circumstances, the site identifier may be determined through a dynamic discovery process. The site-identifier identifies the L2 network that includes the OTV edge device. In operation, if the site-identifier is not configured (or discovered) on an edge device, that edge device will not forward any traffic on any overlay (even if the site is single-homed). The site-identifier is a global configuration command that may configured on an edge device in various formats, as shown below in Table 1.

TABLE 1

| | |
|---|---|
| <0x1-0xffffffff> | Site-identifier in hexadecimal format |
| E.E.E | Site ID in MAC address format (Option 1) |
| EE-EE-EE-EE-EE-EE | Site ID in MAC address format (Option 2) |
| EE:EE:EE:EE:EE:EE | Site ID in MAC address format (Option 3) |
| EEEE.EEEE.EEEE | Site ID in MAC address format (Option 4) |

After the site-identifier is configured by the user, the OTV component that hosts this information publishes the value into a shared database. IS-IS routing protocols are then used to read this value from the shared database and embed the value in the hello packets to be sent out over the site network and the overlay network. Any router that receives these hello packets will classify the sender as belonging to a site distinguished by the site-identifier contained in the hello packet. The adjacency setup on the overlay and the site sides individually follow the standard IS-IS routing protocol techniques. However the site-identifier helps in determining the dual adjacency members.

Figure 2:
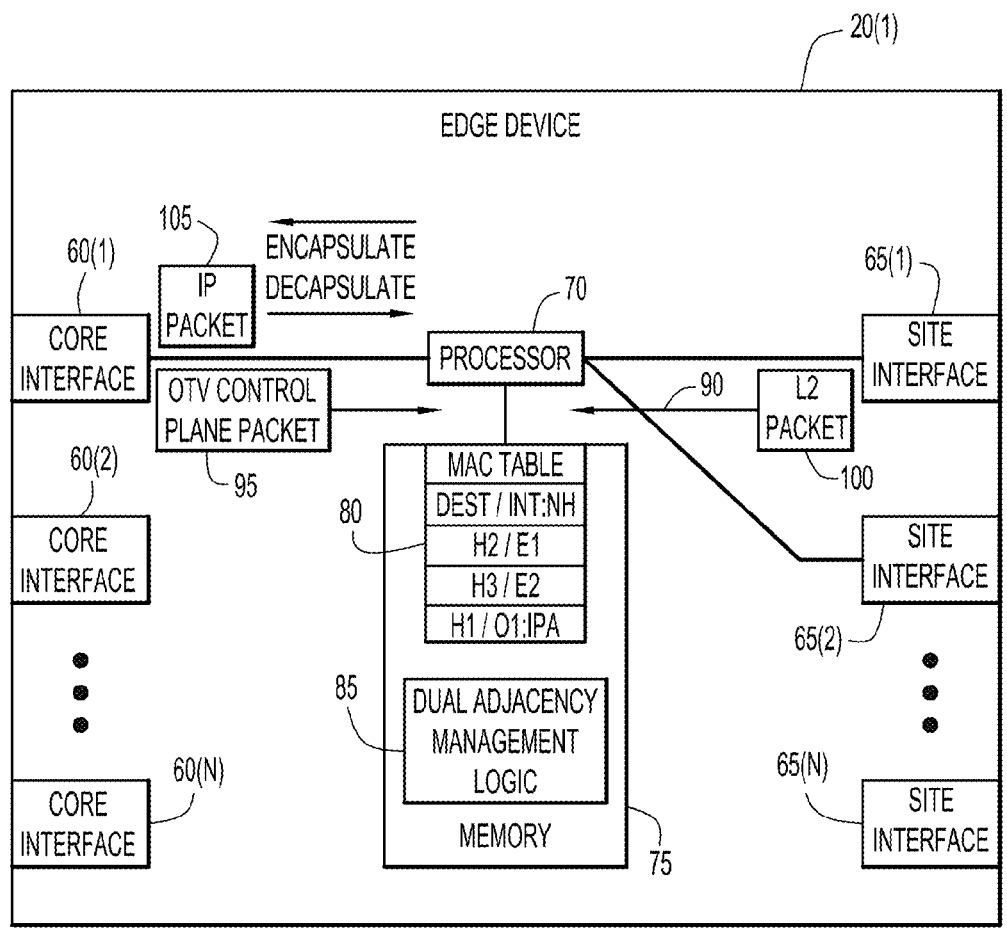
FIG. 2 is a block diagram of an example edge device used by a network site to communicate with other sites via the core network.

FIG. 2 is a block diagram of one example implementation of edge device 20(1) of FIG. 1. The term "edge device" as used herein refers to a network device that will typically run as a layer 2 device (e.g., switch), but can be disposed in a device that performs layer 3 routing on other layer 3-enabled ports. For example, the device may perform MAC learning (i.e., site-facing) to learn the MAC addresses of attached routers and run cIGP to learn about host reachability. It is to be understood that the references herein to a layer 2 device include devices that perform layer 3 routing.

Edge device 20(1) comprises a plurality of core network facing interface devices, sometimes referred to herein core interfaces 60(1)-60(N), and a plurality of local network facing interface devices, sometimes referred to herein as site interfaces 65(1)-65(N). Edge device 20(1) also comprises a processor 70, and a memory 75 that includes a MAC table 80 and dual-adjacency management logic 85. When executing appropriate software or firmware, the processor 70 is responsible for such tasks as forwarding table computations, network management, and general processing of packets. The processor 70 generally accomplishes all of these functions under the control of software including an operating system and any appropriate applications software (e.g., dual-adjacency management logic 85).

Site interfaces 65(1)-65(N) are operable for communication with network devices at the same network site as the edge device (e.g., intermediate network devices 25(1)-25(3) and/or edge device 20(2)) via local network 35(1). Core interfaces 60(1)-60(N) are operable for communication with edge devices 20(3)-20(6) in network sites 10(2) and 10(3) and, as described below, with edge device 20(2), via the overlay network. The site interfaces 65(1)-65(N) are layer 2 interfaces connected to the intermediate network devices 25(1)-25(3) (e.g., site-based switches or site-based routers), and learn the source MAC addresses of traffic they receive. Traffic received on a site interfaces 65(1)-65(N) may trigger oUMRP advertisements or pMRP group joins, as previously described. Traffic received on the site interfaces 65(1)-65(N) is forwarded according to a table 80 onto another internal interface (regular bridging (or routing in the case of Layer 3 edge device)) or onto the core interface for, for example, OTV forwarding.

In one embodiment, the forwarding table 80 is a MAC table of 48-bit MAC addresses. The table 80 may contain unicast MAC addresses or multicast MAC addresses. The table 80 is populated by conventional data-plane learning on site interfaces 65(1)-65(N) and by the IS-IS protocol (or other IGP protocol) at the control plane on the core interfaces 60(1)-60(N). Arrow 90 illustrates data-plane learning on internal interface 65(1) and arrow 95 illustrates control-plane learning on the core interface 60(1). The table 80 allows the same MAC address to be used in different VLANs and potentially in different VPNs.

The core interfaces 60(1)-60(N) are logical multi-access multicast-capable interfaces and are realized by one or more physical network interface devices. The core interfaces 60(1)-60(N) are assigned an IP address (e.g., IPB) out of the provider/core address space. Even though the core interfaces 60(1)-60(N) have IP addresses, it does not participate in the provider IGP or UMRP, as noted above. The core interfaces 60(1)-60(N) operate as a host connected to the core network 15 for the purposes of multicasting in the provider core. The IP addresses assigned to the core interfaces 60(1)-60(N) are used as a next hop address by the oUMRP, therefore, table 80 for the overlay interface includes a remote IP address as the next hop information for remote MAC addresses. As noted, traffic transmitted out of the core interfaces 60(1)-60(N) is encapsulated with an IP header and traffic received on this interface is decapsulated to produce layer 2 frames.

In one example, processor 70 encapsulates layer 2 (MAC level) packets 100 from site interface 60(1) in IP packets (with unicast or multicast headers) 105 before forwarding the packets to the core network 15, and decapsulates IP packets received from the core network. For example, in one embodiment a unicast frame is encapsulated in an IP unicast packet; a broadcast frame is encapsulated in an ASM/Bidir IP multicast packet; a link-local multicast frame is encapsulated in an ASM/Bidir IP multicast packet; and a customer multicast frame is encapsulated in a SSM IP multicast packet. The ASM/Bidir multicast packet is also used for IS-IS peering.

An edge device 20(1)-20(6) that forwards/receives layer 2 frames to/from the overlay network is referred to herein as an authoritative edge device. As would be appreciated, there may be a plurality of VLANs on the core network 15, and there is a single authoritative edge device for all MAC unicast and multicast addresses for each VLAN. For example, with reference to network site 10(1), edge device 20(1) may be the authoritative edge device for several VLANS on the core network 15, while edge device 20(2) may be the authoritative edge device for several different VLANS on the core network. The authoritative edge device responsibility can be shared with other edge devices for other VLANs so that the traffic load can be balanced across edge devices for all VLANs. The authoritative edge device has the responsibility for forwarding frames from the local network 35(1) to one or more remote sites, the overlay network.

There is only one authoritative edge device for each VLAN because, if more than one device was able to receive/forward traffic, there would be a potential for loops (i.e., traffic that is transmitted from the site via a first edge device may be returned to the network site via a second edge device). Such loops are undesirable and, as such, an authoritative edge device election process is implemented within network site 10(1) to associate (elect) a single edge device 20(1) or 20(2) with each of the implemented VLANs. Authoritative edge device election may be made, for example, by using static VLAN-ID range assignments. In one example, an edge device ordinal is assigned. The ordinal value ranges from 0 to n−1, where n is the number of edge devices per site. Ordinals are preferably contiguously assigned across all edge devices based on IS-IS system ID. The authoritative edge device may also be elected by mapping the VLAN-IDs to an edge device ordinal using a hash function. A hash-based scheme ensures a balanced distribution of VLANs across all edge devices, irrespective of the actual values or ranges in use. It is to be understood that the authoritative edge device election methods described herein are only examples, and that other methods may be used to select the authoritative device.

In circumstances in which a network site includes two or more edge devices, the co-located edge devices will perform the authoritative edge device process and/or communicate the results of the election process on a site adjacency (communication channel on the local network within the site). Conventionally, the co-located edge devices will periodically exchange "hello" packets, using the site adjacency, to ensure the edge device is operational. If a first edge device does not receive a hello packet (or a response to a transmitted hello packet) within a predetermined timeout period from a second edge device, the first edge device will make an assumption that the second device is no longer operational. Additionally, the first edge device will assume that the second edge device is no longer capable of operating as an authoritative edge device and a new authoritative device election process will be triggered or the authoritative device responsibilities of the second device will be transferred to the first edge device (or another edge device in the site).

One problem with the above approach is that the failure to receive a hello packet from another edge device may not be due to a problem with the second edge device, but rather may result from a general failure or problem in the local network. Such failures may disable the site adjacency (thereby preventing communication of the periodic hello packets), but may not impact the ability of the second edge device to operate as an authoritative edge device. As such, while the first edge assumes the second edge device has stopped operation, in practice the second edge device may continue to operate as the authoritative edge device for its elected VLANs. As a result, there may be two authoritative edge devices for the same VLAN and undesirable traffic loops may occur.

Another disadvantage with the above approach is that, if there is a problem that affects the ability of the second edge device to operate as an authoritative edge device, there may be a long delay until the first edge device transfers authoritative edge device responsibility assigned to the second device. This long delay results from the fact that the only way for the first device to determine the failure of the second edge device is the passive (reactive) determination that no hello packets have been received with the timeout period.

Examples described herein are generally directed to providing a first edge device with the ability to determine a failure and proactively inform its co-located edge devices about the failure and of the current operational status of the edge device. This is enabled by the use of a dual-adjacency between the co-located edge devices. Generally, the dual-adjacency operates as a forwarding readiness notification that allows an edge device to reliably and rapidly notify other edge devices about changes in the local forwarding capability, on either the local network of the core network. Furthermore, using this dual adjacency, an edge device can reliably notify its neighbors in the same site regarding a change in the current ability of the edge device to forward traffic for an overlay.

The dual adjacency is controlled through dual-adjacency management logic 85 in memory 75. Memory 75 may comprise read only memory (ROM), random access memory (RAM), magnetic disk storage media devices, optical storage media devices, flash memory devices, electrical, optical, or other physical/tangible memory storage devices. The processor 70 is, for example, a microprocessor or microcontroller that executes instructions for the dual-adjacency management logic 85 logic. Thus, in general, the memory 75 may comprise one or more tangible (non-transitory) computer readable storage media (e.g., a memory device) encoded with software comprising computer executable instructions and when the software is executed (by the processor 70) it is operable to perform the operations described herein in connection with adjacency management logic 85 and, in general, setup, manage, and control, at least a portion of each of the site adjacency 40(1) and overlay adjacency 45(1).

FIGS. 3-6 illustrate various examples of how the dual-adjacencies may be employed in different circumstances that could cause problems in conventional arrangements. For ease of illustration, the examples of FIGS. 3-6 will be described with reference to edge devices 20(1) and 20(2) co-located in network site 10(1) of FIG. 1. In FIGS. 3-6, it is assumed that there are six (6) VLANs on core network 15, referred to as VLANs A, B, C, Z, Y, and Z. During an initial authoritative edge device election process, edge device 20(1) is elected the authoritative edge device for VLANs A, B, and C, while edge device 20(2) is elected the authoritative edge device for VLANs Z, Y, and Z. The use of six VLANs is merely for purposes of illustration and it would be appreciated that a large number of VLANs may be implemented on core network 15.

As noted above and shown in FIG. 3, edge device 20(1) and edge device 20(2) have a dual-adjacency comprised of site adjacency 40(1) and overlay adjacency 45(1). Any hello packet that is received on the L2 network (i.e., network 35(1)) is assumed to be from a site-adjacent neighbor. The site-identifier in the site-hello packets match for all devices in the site. As the site-hello packet is in the site-VLAN context, it contains a list of overlay-identifiers that are configured on the originating device.

The site adjacency 40(1) may be created using, for example, the following process. First, a hello packet is received from the L2 network and the contents are parsed. Next, a determination is made as to whether the site-identifier in the hello packet matches the locally configured value. If so, then the source edge device is added to the dual adjacency database of the overlays that are contained in the hello and it is specified that the information was obtained from site side. If the site-identifier in the hello packet does not match the locally configured value, it is concluded that there is a site-identifier mismatch in the L2 network. As such, forwarding on the overlays that are contained in the hello is stopped.

Additionally, a hello packet that is received from the L3 network (overlay-hello) may belong to a remote edge device or to a site-adjacent device. The site-identifier is used to ascertain this information.

Overlay adjacency 45(1) is created using, for example, the following process. First, a hello packet is received the L3 network and the contents are parsed. Next, a determination is made as to whether the site-identifier in the hello packet matches the locally configured value. If so, then the source edge device is added to the dual adjacency database and it is specified that this information was obtained from the overlay side. If the site-identifier in the hello packet does not match the locally configured value, then the source edge device is considered to be on a remote site.

Figure 3:
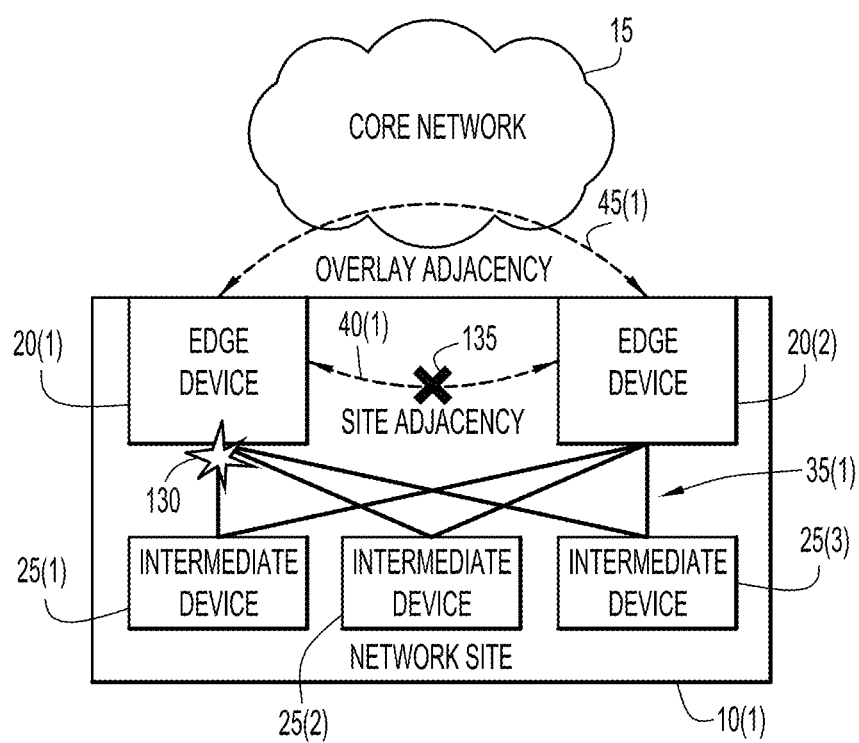
FIGS. 3 and 4 are block diagrams of an example network site and schematically illustrating a failure in a local network of the network site.

In FIG. 3, a failure 130 occurs in the local network at the edge device 20(1) (i.e., the failure is between the edge device 20(1) and the intermediate network devices 25(1)-25(3)). The failure 130 disables the site VLANs and, as such, disables the site adjacency 40(1). Additionally, the failure 130 prevents edge device 20(1) from operating as the authoritative edge device for its elected (associated) VLANs.

Since the failure 130 is local to edge device 20(1), edge device 20(1) is able to detect the failure. However, since the site adjacency 40(1) is disabled, this adjacency cannot be used to inform edge device 20(2) of the failure. As such, the edge device 20(1) is configured to use the overlay adjacency 45(1) to proactively inform edge device 20(2) of the failure. More specifically, edge device 20(1) transmits a notification to edge 20(2) via the overlay adjacency that indicates the failure and informs the edge device 20(2) that the first edge device 20(1) is no longer able to operate as an authoritative edge device. As such, this notification triggers a new authoritative edge device election process in which the edge device 20(1) is removed as a candidate for authoritative edge device election. In the simple example of FIG. 3 where there are only two edge devices, the authoritative edge device responsibilities for VLANs A, B, and C (originally associated with edge device 20(1)) are transferred to edge device 20(2).

One benefit of the arrangement of FIG. 3 is that when edge device 20(1) detects the failure 130, edge device 20(1) has enough information, and the ability to proactively inform the other edge device 20(2) of the failure so that corrective action may be taken. This ability to proactively inform the other edge device is enabled by the overlay adjacency and eliminates the need for the second edge device 20(2) to independently identify the failure after a timeout period.

Figure 4:
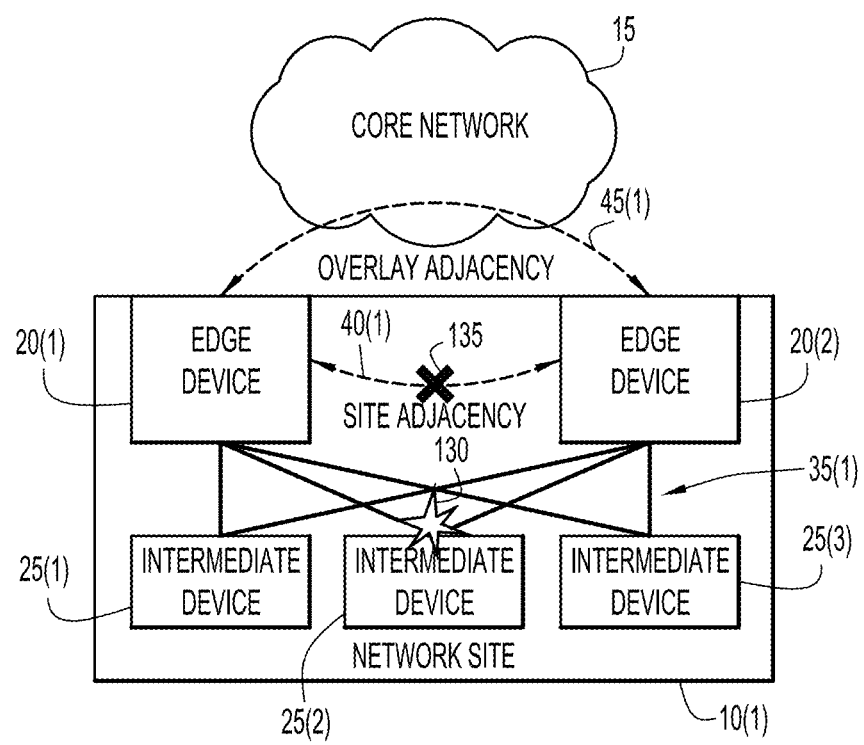

FIG. 4 illustrates a different scenario in which a failure 130 occurs in the local network 35(1) away from the edge device 20(1). In other words, the failure is in the middle of the local network 35(1) and it is not at either of the edge devices 20(1) or 20(2). This type of failure is referred to herein as a "site partition." The failure 130 disables the site VLANs and, as such, disables the site adjacency 40(1). In this case, because the failure is not local to either of the edge devices 20(1) or 20(2), both edge devices may continue to operate as the authoritative edge device for their elected VLANs.

In the example of FIG. 4, since the failure 130 is not local to edge device 20(1) or edge 20(2), neither edge device will be able to directly detect the failure. Rather, both devices will detect the failure after a timeout period in which no packets are received on the site adjacency 40(1). In conventional arrangements, because no packets are received via site adjacency 40(1), the edge devices 20(1) and 20(2) would assume that the other edge device is incapable of operating as an authoritative edge device and thus each would attempt to take over as the authoritative edge device for the VLANs previously associated with the other edge device. However, as noted above, because this is a site partition, both edge devices 20(1) and 20(2) may continue to operate as authoritative edge devices. Therefore, after the timeout period, in conventional arrangements each of edge device 20(1) and 20(2) would declare themselves the authoritative edge device for all VLANs A, B, C, X, Y, and Z, resulting in two connection points for each VLAN and providing the possibility for loops (i.e., traffic returning to the site).

Furthermore, in order to prevent these undesirable loops, the edge devices 20(1) and 20(2) use the overlay adjacency 45(1) to inform the other edge device that they are still operational and capable of operating as the authoritative edge device. More specifically, edge device 20(1) continues to transmit packets on the core network that are received at edge 20(2) via the overlay adjacency 45(1). Because, as noted above, the edge devices 20(1) and 20(2) are configured with the same site-identifier, when edge device 20(2) receives the packet having the same site-identifier, it will determine that the edge device 20(1) is still active and able to operate as an authoritative edge device. Similarly, edge device 20(2) continues to transmit packets on the core network that are received at edge 20(1) via the overlay adjacency 45(1). Because, as noted above, the edge devices 20(1) and 20(2) are configured with the same site-identifier, when edge device 20(1) receives the packet having the same site-identifier, it will determine that the edge device 20(2) is still active and able to operate as an authoritative edge device. As such, this notification triggers a corrective action that may be, for example, to not perform any new authoritative edge device election process, terminate operations at the network site 10(3), etc.

As noted, one benefit of the arrangement of FIG. 4 is that when the edge devices 20(1) and 20(2) detect the failure 130, the edge devices will exchange information via the overlay adjacency 45(1). This exchange of information prevents loops and causes the edge devices 20(1) and 20(2) to take appropriate corrective action, if necessary.

Figure 5:
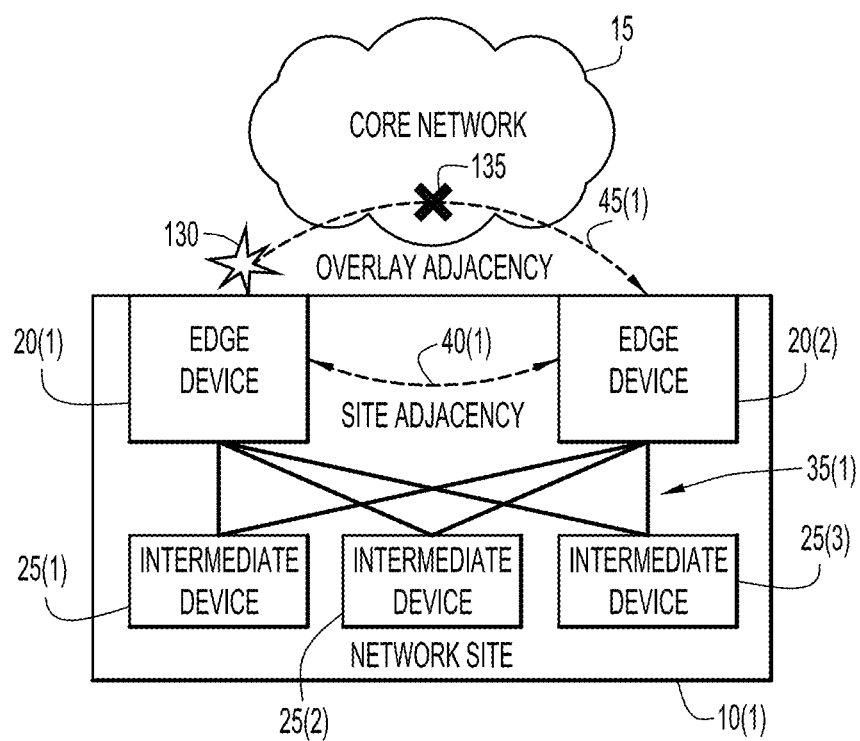
FIGS. 5 and 6 are block diagrams of an example network site and schematically illustrating a failure in the core network.

FIG. 5 illustrates an example scenario in which a failure 130 occurs in the core network 15 at the edge device 20(1). The failure 130 disables the overlay adjacency 45(1). Additionally, the failure 130 prevents edge device 20(1) from operating as the authoritative edge device for its elected VLANs.

Since the failure 130 is local to edge device 20(1), edge device 20(1) is able to detect the failure. However, since the overlay adjacency 45(1) is disabled, this adjacency cannot be used to inform edge device 20(2) of the failure. In this circumstance, the edge device 20(1) uses the site adjacency 40(1) to proactively inform edge device 20(2) of the failure. More specifically, edge device 20(1) transmits a notification to edge 20(2) via the site adjacency 40(1) that indicates the failure and informs the edge device 20(2) that the first edge device 20(1) is no longer able to operate as an authoritative edge device. As such, this notification triggers a new authoritative edge device election process in which the edge device 20(1) is removed as a candidate for authoritative edge device election. In the simple example of FIG. 3 where there is only two edge devices, the authoritative edge device responsibilities for VLANs A, B, and C (originally associated with edge device 20(1)) are transferred to edge device 20(2).

One benefit of the arrangement of FIG. 5 is that when edge device 20(1) detects the failure 130, edge device 20(1) has enough information, and the ability to proactively inform the other edge device 20(2) of the failure so that corrective action may be taken. This ability to proactively inform the other edge device is enabled by the site adjacency 40(1) and eliminates the need for the second edge device 20(2) to independently identify the failure after a timeout period.

Figure 6:
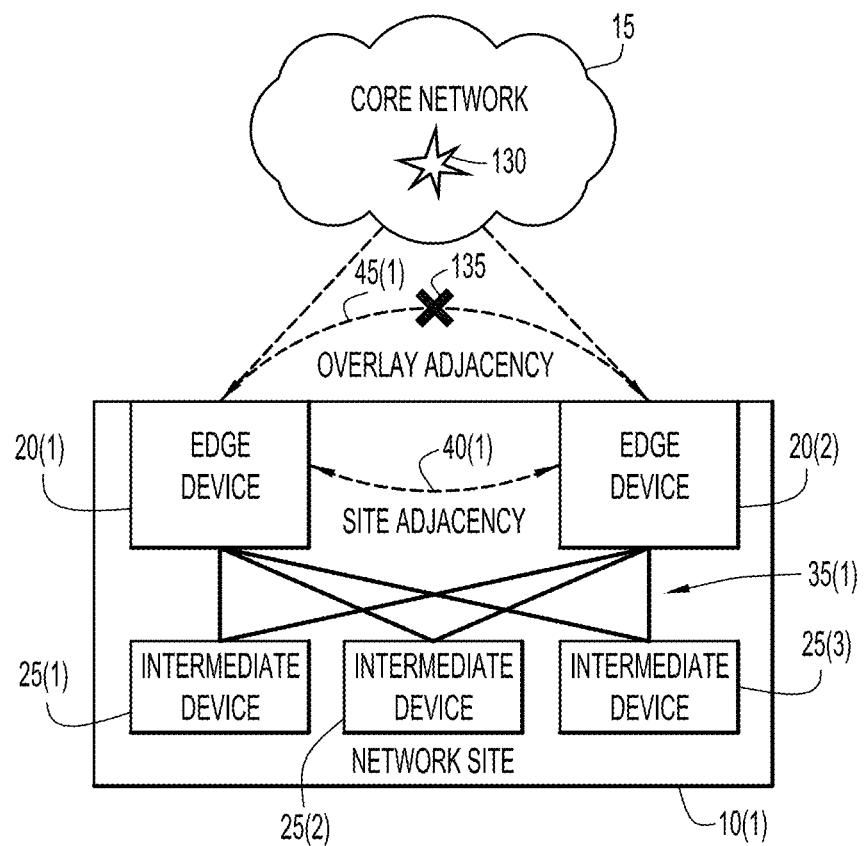

FIG. 6 illustrates a different scenario in which a failure 130 occurs in the core network 15 away from the edge device 20(1). In other words, the failure is in the middle of the core network 15 and it is not at either of the edge devices 20(1) or 20(2). This type of failure is sometimes referred to herein as a "core partition." The failure 130 disables the overlay adjacency 45(1). In this case, because the failure is not local to either of the edge devices 20(1) or 20(2), both edge devices may continue to operate as the authoritative edge device for their elected (associated) VLANs.

In the example of FIG. 6, since the failure 130 is not local to edge device 20(1) or edge 20(2), neither edge device will be able to directly detect the failure. Rather, both devices will detect the failure after a timeout period in which no packets are received on the overlay adjacency 45(1). Because no packets are received via overlay adjacency 45(1), there is the potential that each edge device would assume that the other edge device is incapable of operating as an authoritative edge device and thus each could attempt to take over as the authoritative edge device for the VLANs previously associated with the other edge device. However, as noted above, because this is a core partition, both edge devices 20(1) and 20(2) would continue to operate as authoritative edge devices. Therefore, after the timeout period, each of edge device 20(1) and 20(2) could declare themselves the authoritative edge device for all VLANs A, B, C, X, Y, and Z, resulting in two connection points for each VLAN and providing the possibility for loops (i.e., traffic returning to the site).

In the example of FIG. 6, in order to prevent these undesirable loops, the edge devices 20(1) and 20(2) use the site adjacency 40(1) to inform the other edge device that they are still operational and capable of operating as the authoritative edge device. More specifically, edge device 20(1) continues to transmit packets on the local network that are received at edge 20(2) via the site adjacency 40(1). Because, as noted above, the edge devices 20(1) and 20(2) are configured with the same site-identifier, when edge device 20(2) receives the packet having the same site-identifier, it will determine that the edge device 20(1) is still active and able to operate as an authoritative edge device. Similarly, edge device 20(2) continues to transmit packets on the local network 35(1) that are received at edge 20(1) via the site adjacency 40(1). Because, as noted above, the edge devices 20(1) and 20(2) are configured with the same site-identifier, when edge device 20(1) receives the packet having the same site-identifier, it will determine that the edge device 20(2) is still active and able to operate as an authoritative edge device. As such, this notification triggers a corrective action that may be, for example, to not perform any new authoritative edge device election process, terminate operations at the network site 10(3), etc.

As noted, one benefit of the arrangement of FIG. 6 is that when the edge devices 20(1) and 20(2) detect the failure 130, the edge devices will exchange information via the site adjacency 40(1). This exchange of information prevents loops and causes the edge devices to take appropriate corrective action, if necessary.

In summary, each edge device in a network site is configured to maintain a dual-adjacency for co-located edge devices (i.e., devices in the same site). The dual-adjacency includes, in one example, IS-IS adjacencies established on both the site VLAN (local network) as well as on the overlay network (core network). The dual-adjacency state is used in the authoritative edge device election process, rather than just the site adjacency. Only edge devices with a dual-adjacency in active state will be considered eligible to be authoritative edge devices.

Furthermore, with the dual adjacency, an edge device can reliably notify its neighbors in the same site regarding a change in the current ability of the edge device to forward traffic for an overlay. This explicit forwarding readiness notification allows the neighbor edge devices to get a fast and reliable indication of failure or recovery, rather than solely depending on the IS-IS adjacency creation and teardown. The forwarding readiness may change due to local failures such as the site VLAN or site interfaces or core uplinks going down, or it may be intentional such as when the edge device is starting up and/or initializing. Hence, the IS-IS adjacency may be up, but the forwarding readiness is not advertised.

The forwarding readiness change received from a neighboring edge device in the same site influences the authoritative edge device assignment, and hence will trigger an authoritative edge device election. If a neighbor indicates it is not forwarding ready, it will not be considered as active in the site by other edge devices. A forwarding readiness down notification received over either the site or the overlay adjacency will bring down the neighbor's dual site-adjacency state into inactive state and the resulting authoritative edge device election will not assign any VLANs to that neighbor.

An edge device will indicate its forwarding readiness on both the overlay and site adjacencies. On the neighboring devices, the state of the dual site-adjacency for an edge device is updated by the most recent event received on either the site or the overlay adjacency from the edge device. Hence, even if the edge device has a failure such that it is isolated from the site on the site VLAN, it can still inform its neighboring edge devices via the overlay. Similarly, if an edge device is isolated from the core, the edge device can indicate this failure on the site adjacency. If an edge device has a failure such that it can communicate neither on the overlay nor on the site VLAN, then neighbors will detect this failure when both their adjacencies time out for this device.

Figure 7:
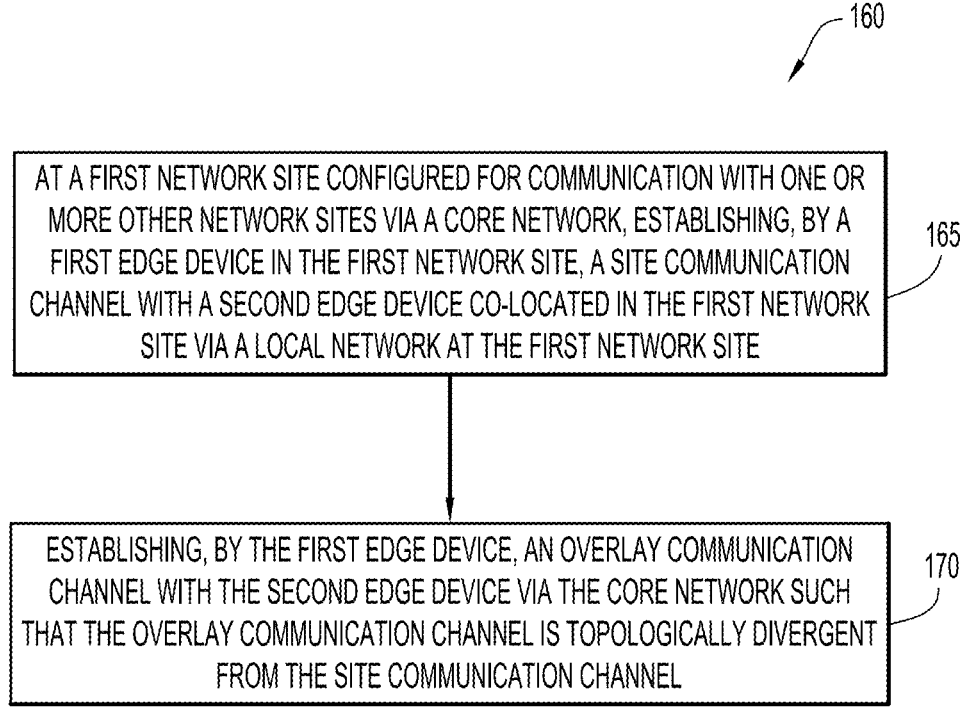
FIG. 7 is a high-level flowchart of a method performed at an edge device in a network site.

FIG. 7 is a flowchart of a method 160 performed at first edge device at a first network site configured for communication with one or more other network sites via a core network. More specifically, at 165 a site communication channel is established between the first edge device and a second edge device co-located in the first network site. The site communication channel, sometimes referred to herein as a site adjacency, is established via a local network at the first network site. At 170, an overlay communication channel is established with the second edge device via the core network such that the overlay communication channel is topologically divergent from the site communication channel. In certain examples, the first and second edge devices are each configured with a site-identifier, and the site and overlay communication channels are established by exchanging, with the second edge device, one or more packets with that include the site-identifier. The agreed upon site-identifier is used for the purposes of multi-homing the site (i.e., a VPN site) containing the first and second edge devices.

In further examples, the core network comprises a plurality of virtual local area networks interconnecting the plurality of network sites, and, in method 160, an authoritative edge device election process is performed using the site and overlay communication channels. As a result, one of the first and second edge devices is elected as the authoritative edge device for different virtual local area networks in the core network. In one specific example, the method 160 further includes detecting, at the first edge device, a failure in the local network at the first edge device that disables the site communication channel and renders the first edge device incapable of operating as an authoritative edge device for its elected virtual local area networks; notifying the second edge device of the failure in the local network via the overlay communication channel; and triggering a new authoritative edge device election process in which the first edge device is removed as a candidate for authoritative edge device election. In another example, the method 160 further includes detecting, at the first edge device, a failure in the local network that disables the site communication channel but not does not affect the ability of each of the first and second edge devices to operate as the authoritative edge device for their respective elected virtual local area networks; and notifying the second edge device, via the overlay communication channel, of the detected failure and that the first edge device is able to continue to operate as the authoritative edge device for its elected virtual local area networks so that a new authoritative edge device election process is not triggered. In a still other example, the method 160 includes detecting, at the first edge device, a failure in the core network at the first edge device that disables the overlay communication channel and renders the first edge device incapable of operating as an authoritative edge device for its elected virtual local area networks; notifying the second edge device of the failure in the local network via the site communication channel; and triggering a new authoritative edge device election process in which the first edge device is removed as a candidate for authoritative edge device election. In yet another example, the method 160 includes detecting, at the first edge device, a failure in the local network that disables the overlay communication channel but not does not affect the ability of each of the first and second edge devices to operate as the authoritative edge device for their respective elected virtual local area networks; and notifying the second edge device, via the overlay communication channel, of the detected failure and that the first edge device is able to continue to operate as the authoritative edge device for its elected virtual local area networks so that a new authoritative edge device election process is not triggered.

The above description is intended by way of example only.

What is claimed is:

1. A method comprising:
   at a first network site configured for communication with one or more other network sites via a core network, establishing, by a first edge device in the first network site, a site communication channel with a second edge device co-located in the first network site via a local network at the first network site and an overlay communication channel with the second edge device via the core network, wherein the overlay communication channel is topologically divergent from the site communication channel;
   detecting, at the first edge device, that one of the site communication channel or the overlay communication channel has experienced a failure while a second one of the site communication channel or the overlay communication channel is operational; and
   notifying the second edge device of the failure in the one of the site communication channel or the overlay communication channel via the second one of the site communication channel or the overlay communication channel, that is still operational.

2. The method of claim 1, wherein the first edge device and the second edge device are each configured with a site-identifier, and wherein establishing each of the site and overlay communication channels comprises:
   exchanging, with the second edge device, one or more packets that include the site-identifier; and
   using the site identifier to multi-home the first network site.

3. The method of claim 1, further comprising:
   dynamically discovering, at each of the first edge device and second edge device, a site identifier; and
   using the site identifier to multi-home the first network site.

4. The method of claim 1, wherein the core network supports a plurality of virtual local area networks interconnecting the plurality of network sites, and wherein the method further comprises:
   performing an authoritative edge device election process using the site and overlay communication channels such that one of the first edge device or second edge device is elected as the authoritative edge device for different virtual local area networks.

5. The method of claim 4, further comprising:
   detecting, at the first edge device, a failure in the local network at the first edge device that disables the site communication channel and renders the first edge device incapable of operating as an authoritative edge device for its elected virtual local area networks;
   notifying the second edge device of the failure in the local network via the overlay communication channel; and
   triggering a new authoritative edge device election process in which the first edge device is removed as a candidate for authoritative edge device election.

6. The method of claim 4, further comprising:
   detecting, at the first edge device, a failure in the local network that disables the site communication channel but not does not affect the ability of each of the first edge device and second edge device to operate as the authoritative edge device for their respective elected virtual local area networks; and
   notifying the second edge device, via the overlay communication channel, that the first edge device is able to continue to operate as the authoritative edge device for its elected virtual local area networks so that a new authoritative edge device election process is not triggered.

7. The method of claim 1, wherein detecting that one of the site communication channel or the overlay communication channel has experienced a failure while a second one of the site communication channel or the overlay communication channel is operational, comprises:
   detecting, at the first edge device, a failure in the local network that disables the site communication channel, and
   wherein the notifying the second edge device of the failure in the one of the site communication channel or the overlay communication channel via the second one of the site communication channel or the overlay communication channel, that is still operational comprises:
   notifying the second edge device of the failure in the local network via the overlay communication channel.

8. The method of claim 4, further comprising:
   detecting, at the first edge device, a failure in the core network at the first edge device that disables the overlay communication channel and renders the first edge device incapable of operating as an authoritative edge device for its elected virtual local area networks;
   notifying the second edge device of the failure in the core network via the site communication channel; and
   triggering a new authoritative edge device election process in which the first edge device is removed as a candidate for authoritative edge device election.

9. The method of claim 4, further comprising:
   detecting, at the first edge device, a failure in the local network that disables the overlay communication channel but not does not affect the ability of each of the first and second edge devices to operate as the authoritative edge device for their respective elected virtual local area networks; and
   notifying the second edge device, via the overlay communication channel, of the detected failure and that the first edge device is able to continue to operate as the authoritative edge device for its elected virtual local area networks so that a new authoritative edge device election process is not triggered.

10. The method of claim 1, wherein detecting that one of the site communication channel or the overlay communication channel has experienced a failure while a second one of the site communication channel or the overlay communication channel is operational, comprises:

detecting, at the first edge device, a failure in the core network that disables the overlay communication channel, and wherein the notifying the second edge device of the failure in the one of the site communication channel or the overlay communication channel via the second one of the site communication channel or the overlay communication channel, that is still operational comprises:

notifying the second edge device of the failure in the core network via the site communication channel.

11. The method of claim 2, wherein establishing the overlay communication channel comprises:

transmitting, by the first edge device, a broadcast packet that includes the site-identifier;

receiving, from the second edge device, a return packet that includes the site-identifier; and transmitting, by the first edge device, an acceptance packet to the second edge device.

12. A network device comprising:

one or more local interfaces configured for communication, via a local network, with one or more network devices co-located in a first network site;

one or more core interfaces configured for communication, via a core network, with one or more network devices located in one or more other network sites connected to the core network; and a processor configured to:

establish a site communication channel with a first edge device in the first network site via at least one of the local interfaces and an overlay communication channel with the first edge device via at least one of the core interfaces, wherein the overlay communication channel is topologically divergent from the site communication channel;

detect that one of the site communication channel or the overlay communication channel has experienced a failure while a second one of the site communication channel or the overlay communication channel is operational; and notify the first edge device of the failure in the one of the site communication channel or the overlay communication channel via the second one of the site communication channel or the overlay communication channel, that is still operational.

13. The network device of claim 12, wherein the network device and the first edge device are each configured with a site-identifier, and wherein to establish each of the site and overlay communication channels, the processor is configured to:

exchange, with the first edge device, one or more packets that include the site-identifier; and use the site identifier to multi-home the first network site.

14. The network device of claim 12, wherein the core network supports a plurality of virtual local area networks interconnecting the plurality of network sites, and wherein the processor is configured to:

trigger an authoritative edge device election process using the site and overlay communication channels such that one of the network device or the first edge device is elected as the authoritative edge device for different virtual local area networks.

15. One or more non-transitory computer readable storage media encoded with software comprising computer executable instructions and when the software is executed operable to:

at a first network site configured for communication with one or more other network sites via a core network, establish, by a first edge device in the first network site, a site communication channel with a second edge device co-located in the first network site via a local network at the first network site and an overlay communication channel with the second edge device via the core network, wherein the overlay communication channel is topologically divergent from the site communication channel;

detect, at the first edge device, that one of the site communication channel or the overlay communication channel has experienced a failure while a second one of the site communication channel or the overlay communication channel is operational; and notify the second edge device of the failure in the one of the site communication channel or the overlay communication channel via the second one of the site communication channel or the overlay communication channel, that is still operational.

16. The non-transitory computer readable storage media 15, wherein the first edge device and second edge device are each configured with a site-identifier, and wherein the instructions operable to establish each of the site and overlay communication channels comprise instructions operable to:

exchange, with the second edge device, one or more packets that include the site-identifier; and use the site identifier to multi-home the first network site.

17. The non-transitory computer readable storage media 15, further comprising instructions operable to:

dynamically discover, at each of the first edge device and second edge device, a site identifier; and use the site identifier to multi-home the first network site.

18. The non-transitory computer readable storage media 15, wherein the core network supports a plurality of virtual local area networks interconnecting the plurality of network sites, and further comprising instructions operable to:

perform an authoritative edge device election process using the site and overlay communication channels such that one of the first edge device or second edge device is elected as the authoritative edge device for different virtual local area networks.

19. The non-transitory computer readable storage media 15, further comprising instructions operable to:

detect, at the first edge device, a failure in the local network at the first edge device that disables the site communication channel and renders the first edge device incapable of operating as an authoritative edge device for its elected virtual local area networks;

notify the second edge device of the failure in the local network via the overlay communication channel; and trigger a new authoritative edge device election process in which the first edge device is removed as a candidate for authoritative edge device election.

20. The non-transitory computer readable storage media 15, further comprising instructions operable to:

detect, at the first edge device, a failure in the core network at the first edge device that disables the overlay communication channel and renders the first edge device incapable of operating as an authoritative edge device for its elected virtual local area networks;

notify the second edge device of the failure in the core network via the site communication channel; and trigger a new authoritative edge device election process in which the first edge device is removed as a candidate for authoritative edge device election.

\* \* \* \* \*